Oct. 6, 1931.   R. R. TEETOR   1,825,893

PISTON AND PISTON RING

Filed June 16, 1930

Inventor:
Ralph R. Teetor.
By Rector, Hibben, Davis and Macauley
Att'ys

Patented Oct. 6, 1931

1,825,893

UNITED STATES PATENT OFFICE

RALPH R. TEETOR, OF HAGERSTOWN, INDIANA, ASSIGNOR TO THE PERFECT CIRCLE COMPANY, OF HAGERSTOWN, INDIANA, A CORPORATION OF INDIANA

PISTON AND PISTON RING

Application filed June 16, 1930. Serial No. 461,319.

My invention relates to pistons and piston rings for internal combustion engines and more particularly to oil regulating rings for effectively removing excess lubricant from the walls of the cylinder and preventing oil pumping.

The principal object of my invention is to provide an oil regulating ring having elongated drain slots widened at the exterior face of the ring to provide narrow marginal ribs having cylinder contacting surfaces of minimum area and adapted to exert substantially uniform pressure against the cylinder wall throughout the circumference of the ring.

My invention will be more fully explained by reference to the accompanying drawings in which.

Figure 1:
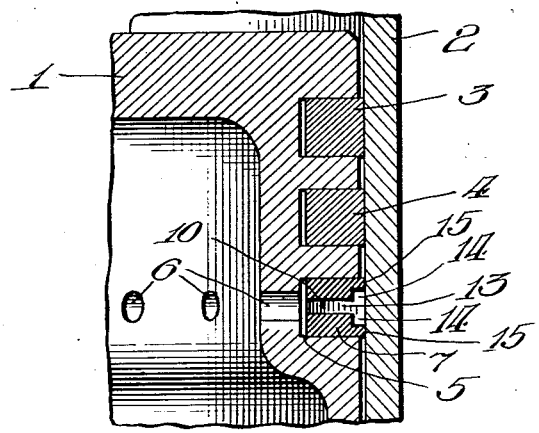
Fig. 1 is a fragmentary view, in longitudinal section, of the engine cylinder, piston, and ring embodying my invention.
Figure 2:
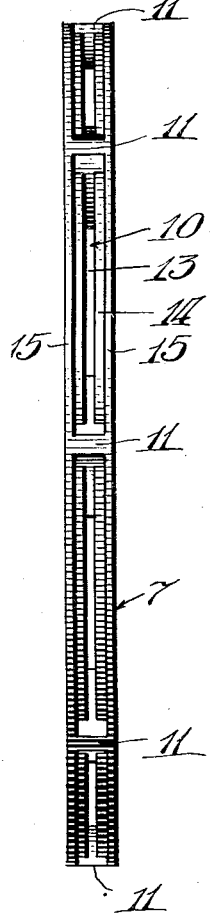
Fig. 2 is an edge elevation of my ring.
Figure 3:
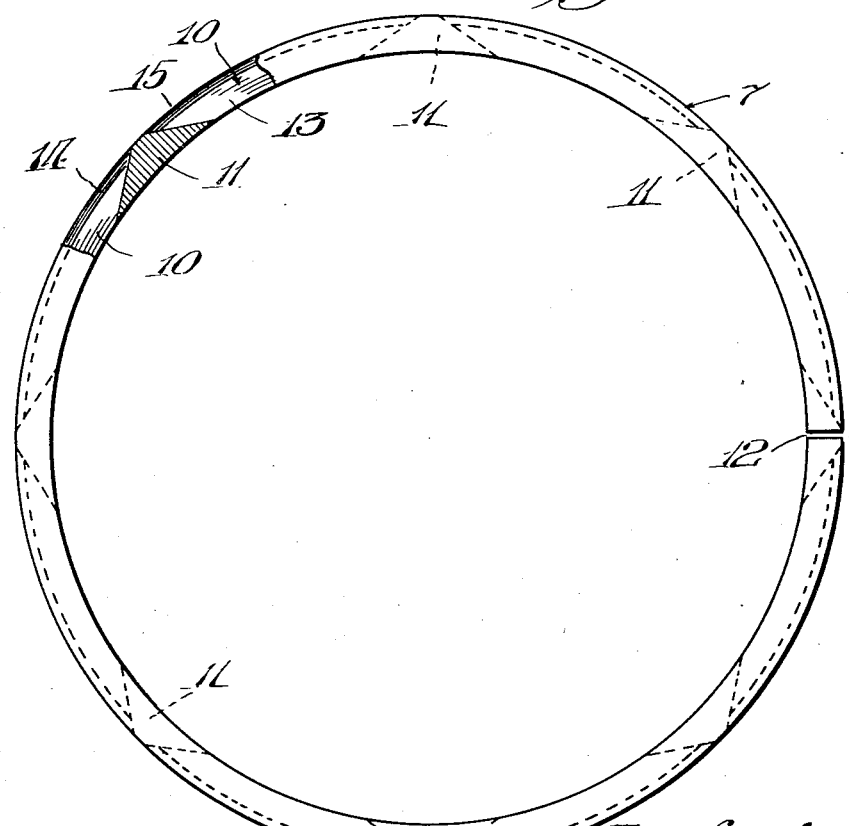
Fig. 3 is a top plan view.

The piston 1 which is mounted in the engine cylinder 2 is equipped with the usual compression rings 3 and 4, and is provided with an annular groove 5 connected by oil drain apertures 6 with the interior of the piston. Seated in the groove 5 is a ring 7 embodying my invention.

The ring 7 is provided with a series of closely adjacent elongated slots 10 having inwardly converging ends, the ends of the slots being separated by triangular-shaped solid portions or bridges 11, the small apexes of which are arcuate and flush with the outer face of the ring. The solid portion 11 at the split or joint 12 is cut radially so that the adjacent ends of the end slots 10 are closed at the joint.

Each slot 10 has its inner portion 13 of narrow width and its outer portion 14 of substantially greater width to form narrow ribs 15 on either side. The portion 14 is of uniform width and the sides of the ribs 15 are parallel and preferably radial. The portion 14 of each slot is also of uniform and shallow depth. The ribs 15 are quite narrow so that the area of their combined cylinder contacting surfaces is preferably substantially less than one-half the area of the entire face of the ring.

It is understood that the excess lubricating oil is scraped from the cylinder wall and conducted by the slots 10 to the back of the ring and thence through the drain openings 6 into the interior of the piston and back to the crank case. My ring accomplishes this result in a highly efficient manner and with minimum wear on the ring and the cylinder wall. The portions 13 of the slots are narrow and the depth of the portions 14 is shallow so that the cross sectional area and hence the inherent expansive pressure of the ring against the cylinder wall is not materially reduced thereby. The portions 14 of the slots are substantially wider than the portions 13 to readily collect the excess oil from the cylinder wall and also to provide the very narrow ridges 15 with cylinder contacting surfaces of minimum area, the pressure per unit of bearing surface being thus greatly increased without materially reducing the tension of the ring or necessitating the use of a larger ring. The ribs 15 are of uniform width so that the ring maintains its true circular form and throughout its circumference exerts substantially uniform pressure against the cylinder walls.

I claim:

1. An oil ring for the piston of an internal combustion engine having elongated slots extending through the ring and from the exterior face to the inner face of the ring, with their ends closely adjacent but separated by bridges extending to the exterior face of the ring, the inner portions of the slots being narrow and the outer portions being shallow and of substantially uniform depth and also being substantially wider than the inner portions to provide on either side of the outer portions substantially continuous, parallel and narrow ribs having cylinder contacting surfaces of a combined area substantially less than one-half of the entire area of the exterior face of the ring.

2. An oil ring for the piston of an internal combustion engine having elongated, converging-ended slots extending through the ring and from the exterior face of the ring to the inner face of the ring and separated by bridges extending to the exterior face of the ring, the inner portions of the slots being narrow and of uniform width and the outer portions being substantially wider than the inner portions and also of uniform width and depth to provide on either side of the outer portions narrow ribs of uniform width and depth and with cylinder contacting surfaces of a combined area substantially less than one-half of the entire area of the exterior face of the ring.

3. An oil ring for the piston of an internal combustion engine having elongated slots extending through the ring from the exterior face to the inner face of the ring, with their ends closely adjacent but separated by bridges extending to the exterior face of the ring, the outer portions of the slots being relatively shallow and substantially wider than the inner portions to provide on either side of the outer portions substantially continuous, parallel and narrow ribs having cylinder contacting surfaces of a combined area substantially less than one-half the entire area of the exterior face of the ring.

4. In an oil ring for the piston of an internal combustion engine having a substantially uniform width and elongated slots extending through the ring from the exterior face to the inner face of the ring with their ends closely adjacent but separated by bridges extending to the exterior face of the ring, the outer ends of the bridges being substantially narrow, the outer portions of the slots being relatively shallow and substantially wider than the inner portions to provide on either side of the outer portions substantially continuous parallel and narrow ribs at the outer corners of the ring, the combined area of the cylinder contacting surfaces of the ring being not more than one-half of the entire area of the exterior face of the ring.

5. In an oil ring for the piston of an internal combustion engine having a substantially uniform width and elongated slots extending through the ring from the exterior face to the inner face of the ring with their ends closely adjacent but separated by bridges extending to the exterior face of the ring, the outer portions of the slots being of substantially uniform width, relatively shallow and wider than the inner portions which are positioned substantially centrally of the outer portions, the outer portions providing on either side substantially continuous narrow ribs each of a substantially uniform width of not more than one-half the width of said outer portions of said slots.

6. A split resilient piston ring provided with annular ribs, bridges connecting said ribs, the said ribs being of uniform width and comparatively narrow and the outer edges of the bridges being comparatively narrow, the ribs and bridges forming a continuously extending series of wide shallow channels, and the ring being also provided with a plurality of slots in said channel, the said slots being of less width than the channels and extending through the ring, the cylinder contacting face of said ring comprising the outer edge surfaces of said ribs and bridges.

In testimony whereof, I have subscribed my name.

RALPH R. TEETOR.